(12) United States Patent
Voigt

(10) Patent No.: US 9,678,871 B2
(45) Date of Patent: Jun. 13, 2017

(54) DATA FLUSH OF GROUP TABLE

(71) Applicant: Hewlett Packard Development Company LP, Houston, TX (US)

(72) Inventor: Douglas L Voigt, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 10 days.

(21) Appl. No.: 14/760,401

(22) PCT Filed: Mar. 28, 2013

(86) PCT No.: PCT/US2013/034398
§ 371 (c)(1),
(2) Date: Jul. 10, 2015

(87) PCT Pub. No.: WO2014/158168
PCT Pub. Date: Oct. 2, 2014

(65) Prior Publication Data
US 2015/0356012 A1    Dec. 10, 2015

(51) Int. Cl.
| | | |
|---|---|---|
| *G06F 12/00* | (2006.01) | |
| *G06F 12/0804* | (2016.01) | |
| *G06F 12/02* | (2006.01) | |
| *G06F 12/0891* | (2016.01) | |
| *G06F 12/0866* | (2016.01) | |
| *G06F 11/20* | (2006.01) | |
| *G06F 3/06* | (2006.01) | |

(52) U.S. Cl.
CPC ...... *G06F 12/0804* (2013.01); *G06F 11/2094* (2013.01); *G06F 11/2097* (2013.01); *G06F 12/0238* (2013.01); *G06F 12/0866* (2013.01); *G06F 12/0891* (2013.01); *G06F 3/064* (2013.01); *G06F 3/065* (2013.01); *G06F 2201/82* (2013.01); *G06F 2212/1032* (2013.01); *G06F 2212/214* (2013.01); *G06F 2212/281* (2013.01)

(58) Field of Classification Search
None
See application file for complete search history.

(56) References Cited

U.S. PATENT DOCUMENTS

| | | |
|---|---|---|
| 6,360,231 B1 | 3/2002 | Pong et al. |
| 6,643,671 B2 | 11/2003 | Milillo et al. |
| 6,658,540 B1 | 12/2003 | Sicola et al. |

(Continued)

FOREIGN PATENT DOCUMENTS

| | | |
|---|---|---|
| EP | 1510924 A1 | 3/2005 |
| EP | 2428896 | 3/2012 |

(Continued)

OTHER PUBLICATIONS

Blundell, C. et al., Subtleties of Transactional Memory Atomicity Semantics, (Research Paper), Feb. 2006, vol. 5, No. 2, 4 pps., http://acg.cis.upenn.edu/papers/cal06_atomic_semantics.pdf.

(Continued)

*Primary Examiner* — Kevin Verbrugge
(74) *Attorney, Agent, or Firm* — Hewlett Packard Enterprise Patent Department

(57) ABSTRACT

A group table includes one or more groups. A synch command including a synch address range is received. An order data of the one or more groups is flushed is determined by whether the synch address range is included in the one or more groups.

20 Claims, 5 Drawing Sheets

(56) References Cited

U.S. PATENT DOCUMENTS

| | | |
|---|---|---|
| 6,789,156 B1 | 9/2004 | Waldspurger |
| 7,133,982 B2 | 11/2006 | Werner et al. |
| 7,464,126 B2 | 12/2008 | Chen |
| 7,734,883 B2 | 6/2010 | Spear et al. |
| 7,818,515 B1 | 10/2010 | Umbehocker et al. |
| 8,195,615 B2 | 6/2012 | Schlomer et al. |
| 8,244,969 B2 | 8/2012 | McWilliams et al. |
| 9,053,027 B1 | 6/2015 | Harvey et al. |
| 2004/0260673 A1 | 12/2004 | Hitz et al. |
| 2006/0031450 A1 | 2/2006 | Unrau et al. |
| 2007/0022264 A1 | 1/2007 | Bromling et al. |
| 2007/0143545 A1 | 6/2007 | Conley et al. |
| 2007/0233947 A1 | 10/2007 | Coulson et al. |
| 2007/0239944 A1 | 10/2007 | Rupanagunta et al. |
| 2007/0288587 A1 | 12/2007 | Aguilera et al. |
| 2008/0229428 A1 | 9/2008 | Camiel |
| 2009/0300078 A1 | 12/2009 | Boyd et al. |
| 2010/0125555 A1 | 5/2010 | Lau et al. |
| 2010/0199042 A1 | 8/2010 | Bates et al. |
| 2010/0268899 A1 | 10/2010 | Etoh et al. |
| 2010/0325376 A1 | 12/2010 | Ash et al. |
| 2011/0072189 A1 | 3/2011 | Post et al. |
| 2011/0072196 A1 | 3/2011 | Forhan et al. |
| 2011/0238899 A1 | 9/2011 | Yano et al. |
| 2013/0332660 A1 | 12/2013 | Talagala et al. |
| 2014/0075122 A1 | 3/2014 | Banikazemi et al. |

FOREIGN PATENT DOCUMENTS

| | | |
|---|---|---|
| JP | 2005310008 | 11/2005 |
| TW | I370359 | 8/2012 |
| TW | I383322 | 1/2013 |

OTHER PUBLICATIONS

Distributed Shared Memory, (Research Paper), Mar. 17, 2005, pp. 749-781, http://www.cdk5.net/dsm/Ed4/Chapter%2018%20DSM.pdf.

International Search Report and Written Opinion received in PCT Application No. PCT/US2013/034382, mailed Dec. 26, 2013, 9 pgs.

International Search Report and Written Opinion received in PCT Application No. PCT/US2013/034398, mailed on Dec. 26, 2013, 12 pgs.

Extended European Search Report received in EP Application No. 13880042.0, Sep. 21, 2016, 10 pages.

Gill, B. S. et al., "WOW: Wise Ordering for Writes—Combining Spatial and Temporal Locality in Non-Volatile Caches," Proceedings of the 4th Conference on USENIX Conference on File and Storage Technologies, vol. 4, USENIX Association, 2005, pp. 129-142.

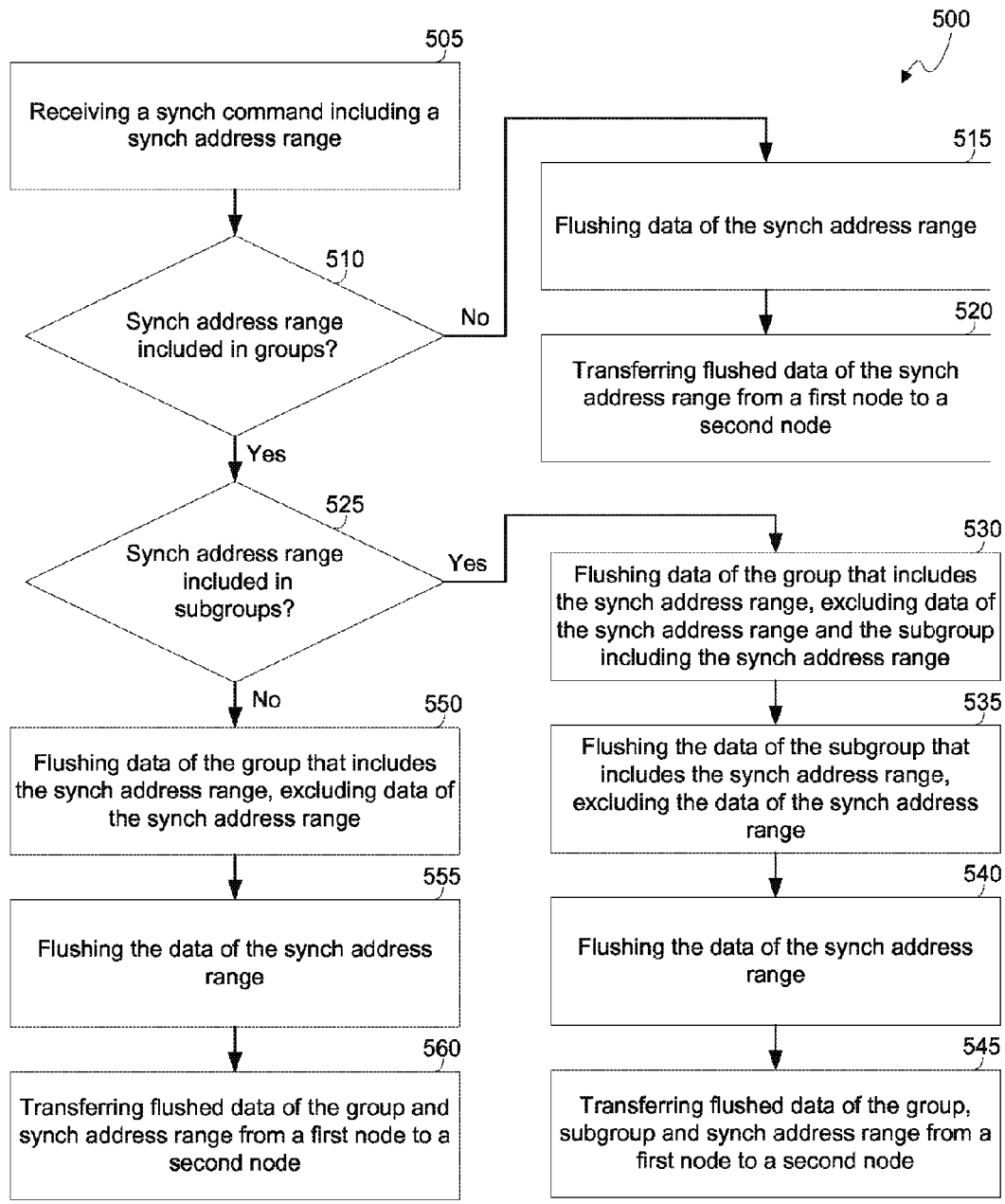

DATA FLUSH OF GROUP TABLE

BACKGROUND

Due to recent innovations in solid state storage technology, such technology is being integrated into data systems. Servers of the data systems may seek to write data to or read data from the solid state storage technology. Users, such as administrators and/or vendors, may be challenged to integrate such technology into systems while maintaining atomicity.

BRIEF DESCRIPTION OF THE DRAWINGS

The following detailed description references the drawings, wherein:

FIG. 5 is an example flowchart of a method for flushing and transferring data.

DETAILED DESCRIPTION

Figure 1:
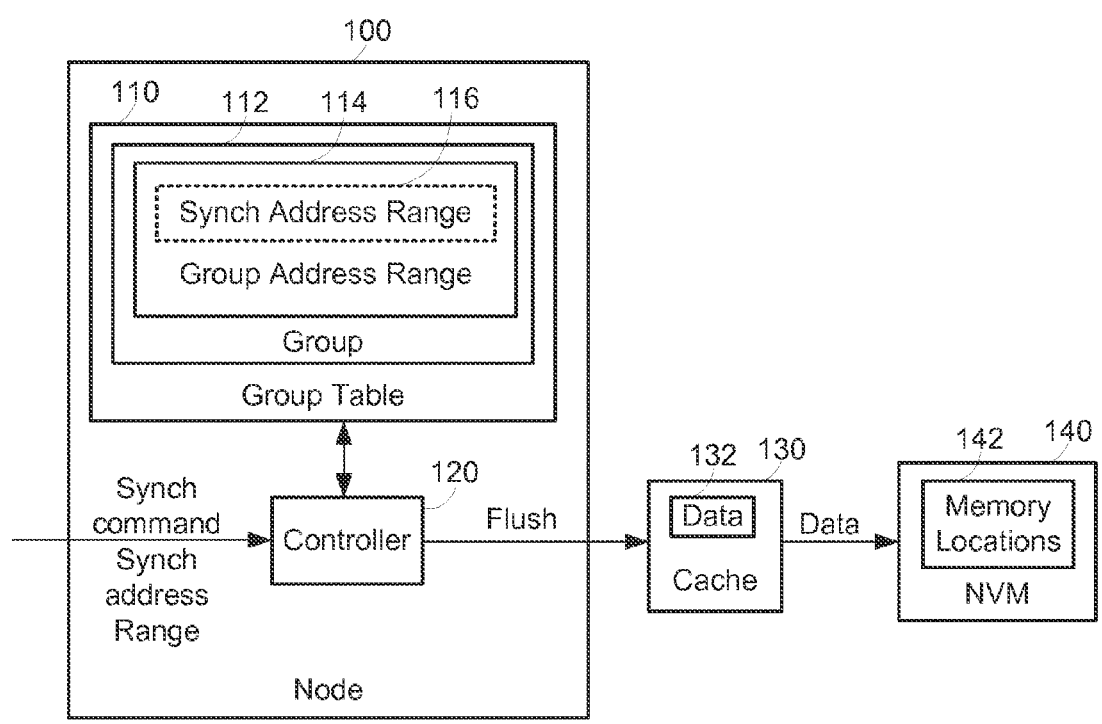
FIG. 1 is an example block diagram of a node to flush data to a non-volatile memory.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Non-Volatile memory (NVM) technologies such as Memristor may offer both durability and memory speed access. This type of NVM may be mapped into server memory space for direct load/store access. When applying a full range of rich data services for redundancy, replication, backup and archive to memory mapped storage, it may be necessary to establish groupings of data which must remain self consistent within and across multiple memory systems.

Memory consistency is generally managed locally by processors and memory controllers. While existing approaches may enforce strict ordering and cache coherency, these approaches may not scale for clustered, federated, remote replication and/or client/server relationships such as those that might exist between application servers and storage servers. The root cause of this is that strict consistency as seen in a single processor or symmetric multiprocessor (SMP) system may be cost prohibitive to maintain beyond a limited physical scope.

When NVM is written directly to by processors using store instructions, a synchronization operation is used to assure sufficient consistency to guarantee recoverability in the event of failure or abrupt power loss. The synchronization operations usually only refer to a single contiguous range of memory locations. Generally a synchronization operation involves flushing of processor caches to a NVM. Flushing large amounts of cache can take time and decrease processor write performance. Consistency groups may be used within storage products such as disk arrays to insure that remote replication and point in time copy operations on block storage maintain application level recoverability. In storage products, a consistency group may consist of a number of virtual volumes or Logical Unit Numbers (LUNs). Processor cache flushing operations as well as memory mapping and synchronization operations may operate against contiguous ranges of memory locations. These operations may not account for application level consistency associations between disjoint ranges of memory locations other than through strict tracking of fine grained ordering constraints which do not scale well.

Embodiments may expand a scope of a synchronization operation without requiring changes to its interface by retaining a list of memory ranges in one or more groups. These groups may be defined by applications to address their specific consistency requirements. For example, a node may include a group table and a controller. The group table may include one or more groups. Each of the groups may be associated with a group address range. The group address ranges may be mapped to a memory location of a NVM. The controller may receive a synch command including a synch address range and may flush data from a cache to the NVM according to an order determined by the group table. The group table may determine at least one of an order the controller flushes the data and which of the data the controller flushes based on whether the synch address range is included in one of the group address ranges.

In one embodiment, all of the dirty cache addresses in the group that contain an address specified in a synch command are flushed during that synchronize command with the specified address of the synch command being flushed last. In some embodiments, the groups may contain subgroups. Each of the subgroups may consist of a set of subgroup address ranges that are a subset of the groups address ranges in the group. When an address that resides within a subgroup is synchronized, the additional dirty addresses in the subgroup address range specified by that subgroup and possibly any other dirty cache addresses that are in the same group but not in any subgroup may also be flushed. Thus, embodiments, may allow, for example, metadata in a subgroup to be made consistent after other data in the same group.

Groups and subgroups may include tracking information that includes a bit map of address ranges that need to be transferred for replication. Synchronization operations may wait for the completion of the transfer of the flushed addresses in order to insure redundancy and to support the operation of rich data services against consistent application data images. Transfer may involve a persistent, redundant log in which placement of data in the log constitutes transmission.

Thus, embodiments may mitigate an amount of data to be flushed by allowing applications to explicitly express which memory locations must be synchronized together as part of the same group. Embodiments of the groups may add structure to both the flushing of data from processor to NVM and the creation of a stream of synchronized data between nodes. This may enable consistent data images or virtualized images to be established that adhere to application specific rules. These images may then be cast as various types of data replicas or used to perform data analysis such as deduplication or classification that require consistent and recoverable states of the data.

Referring now to the drawings, FIG. 1 is an example block diagram of a node 100 to flush data to a non-volatile memory (NVM) 140. The node 100 may be part of or included in, for example, a storage device, computer, switch, enclosure, server, controller and/or any type of device connected to a network. In the embodiment of FIG. 1, the node 100 is shown to include a group table 110 and a controller 120. Further, the node 100 is shown to interface with a cache 130 and the NVM 140 via the cache 130.

The node 100 may include, for example, a hardware device including electronic circuitry for implementing the functionality described below, such as control logic and/or memory. In addition or as an alternative, the node 100 may be implemented as a series of instructions encoded on a machine-readable storage medium and executable by a processor. The cache 130 may be any type of device to store data 132 to be written to and/or read from a storage device, such as the NVM 140 130, so that requests to write and/or read data may be served with lower latency than that of the storage device.

The NVM 140 may include any type of device that retains its data when power is turned off, such as read-only memory, flash memory, ferroelectric RAM (F-RAM), most types of magnetic computer storage devices (e.g. hard disks, floppy disks, and magnetic tape) and optical discs as well as Memristor-based, Spin-Torque transfer, and Phase Change random-access memory. For example, the NVM may include a memory that is read or written on a per-byte or per-processor-cache line basis.

Returning to the node 100, the group table 110 includes a group 112 and the group 112 includes a group address range 114. The group address range 114 may include one or more addresses that are mapped to one or more memory locations 142 of the NVM 140. The term mapping may refer to a technique for incorporating one or more memory addresses of a device, such as the NVM 140, into an address table of another device, such as group table 110 of the node 100. While the group table 110 is shown to include a single group 112 and the group 114 is shown to include a single group address range 114, embodiments of the group table 110 may include a plurality of groups 112 and embodiments of the group 112 may include a plurality of address ranges 114.

The controller 120 may receive a synch command including a synch address range 116. For example, an application (not shown), may occasionally generate the synch command in order to define a recovery point. The synch command may be generated, for example, via an explicit call or it may be implicit in some use of the language in which the application is written. The synchronization operation may traverse either a software path or a hardware path to the NVM 140. The synch address range 116 may relate to one or more addresses, such as addresses at the cache 130, that the application wishes to flush or write back to the NVM 140. The application may create one or more of the groups 112 to represent its large scale data structures such as data tables, indices and logs. The application may then populate the groups 112 with group address ranges 114 that reflect the application's overall data structures.

The synch operation may include flush instructions, which are executed by a processor (not shown) and/or synchronization commands that are communicated to the NVM 140. For example, during the sync operation, virtual memory tables (not shown), group tables 110 and/or subgroup tables (not shown) may be used to coordinate the flushing of additional addresses (or pages) over and above those initially referenced by the synch address range 116 of the synch command. These additional addresses may be determined by the group table 110 based on whether the synch address range 116 is included in a group address range 114 of any of the groups 112 of the group table 110.

Thus, the controller 120 may selectively flush the data 132 from the cache 130 to the NVM 140 according to the order determined by the group table 110, in response to the synch command. The group table 110 may determine at least one of an order the controller 120 flushes the data and which of the data the controller 120 flushes based on whether the synch address range 116 is included in one of the group address ranges 114. The sync operation may also transfer the flushed data to another node, such as another server, according to an order that retains application level consistency, as determined by the group table 110. The group table 110 will be described in greater detail below with respect to FIG. 2.

Figure 2:
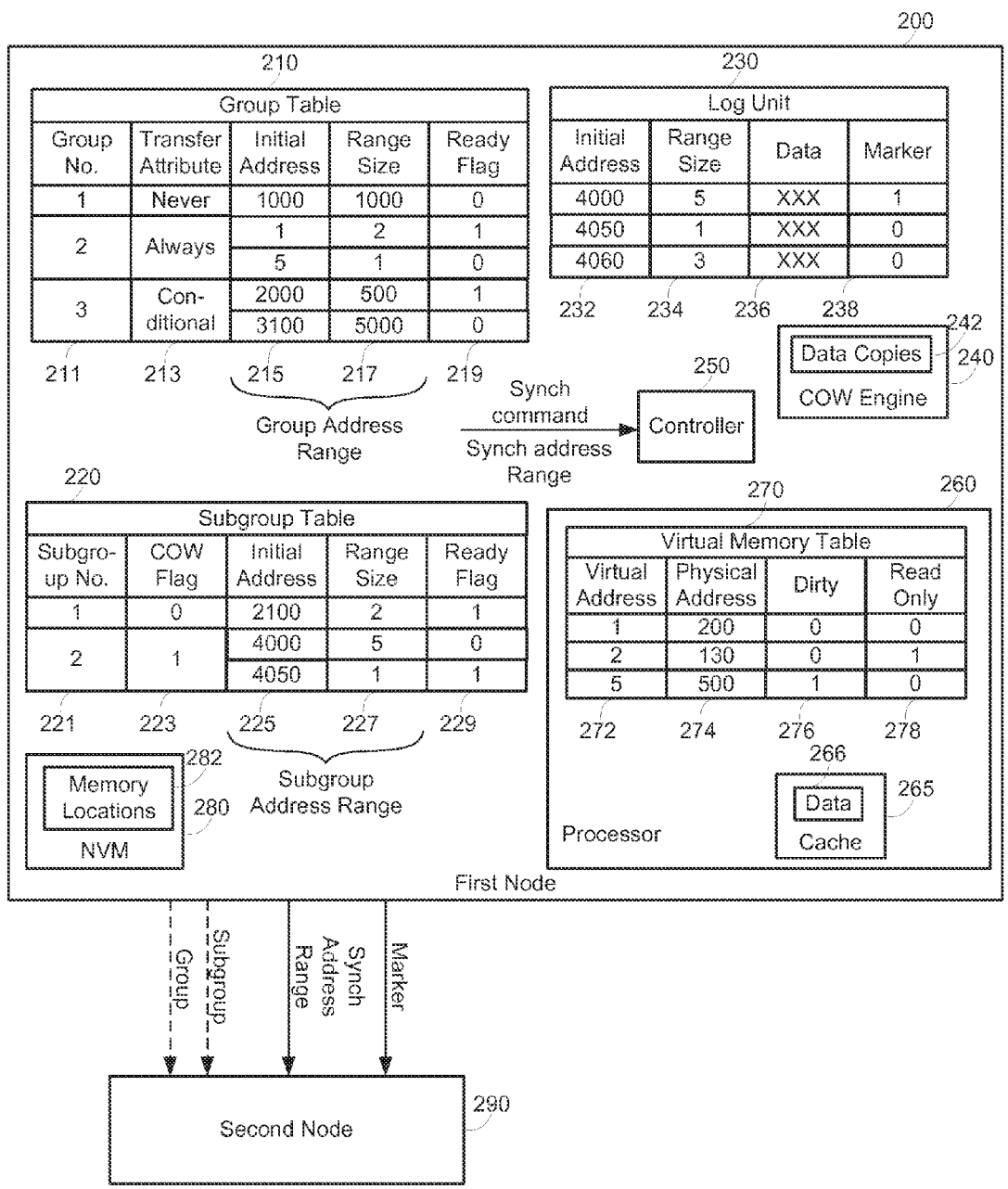
FIG. 2 is an example block diagram of a first node to flush data to a non-volatile memory and to transfer the flushed data to a second node.

FIG. 2 is an example block diagram of a first node 200 to flush data to a NVM 280 and to transfer the flushed data to a second node 290. In FIG. 2, the node 200 includes a group table 210, a subgroup table 220, a log 230, a copy-on write (COW) engine 240, a controller 250 and a processor 260. The processor 260 further includes a cache 265 and a virtual memory (VM) table 270. The first node 200 is shown to interface with a second node 290, such as via a network connection.

The first and second nodes 200 and 290 of FIG. 2 may include similar functionality and/or hardware to the node 100 of FIG. 1. For example, the group table 210 and the controller 250 of FIG. 2 may respectively include the functionality and/or hardware to the group table 110 and the controller 120 of FIG. 1. Further, the cache 265 and the NVM 280 of FIG. 2 may respectively include the functionality and/or hardware to the cache 130 and the NVM 140 of FIG. 1.

The processor 260 may be, at least one central processing unit (CPU), at least one semiconductor-based microprocessor, at least one graphics processing unit (GPU), other hardware devices suitable for retrieval and execution of instructions. In order to execute a synchronization operation, the processor 260 may flush data 266 from the cache 265, such by flushing a write cache by cache line or page. Writes to memory locations 282 may originate within the processor's 260 instruction execution pipeline and propagate over time through a write pipeline within the processor that includes multiple levels of caches. Processor 260 instructions that flush this pipeline and insure ordering of writes may be available for use during synchronization operations.

Embodiments may facilitate more selective use of flush to maintain processor pipeline performance when possible. The VM table 270 is shown to include a virtual address column 272, a physical address column 274, a dirty flag column 276 and a read only column 278. The VM table 270 may facilitate the processor 260 by rapidly identifying a physical memory address at the physical address column 274 that is associated with a virtual memory address at the virtual address column 272.

The dirty flag column 276 may track which of the physical memory addresses have been modified since they were written to the NVM 280, such as by setting the associated dirty flag to one. The synch address range included in the synch command may be determined based on the physical address 274 of the VM table 270 that is associated with a dirty flag that is set. Depending on the processor 260, a dirty flag of the dirty flag column 276 may be set when the write enters or exits the processor's 260 pipeline. The read only column 278 may track which of the physical memory addresses cannot be written to, such as to trap writes to physical memory addresses that require book-keeping. For instance, a copy-on-write (COW) may need to be preserved before a normal write can be completed.

In addition to the function described in FIG. 1, the controller 250 may selectively transmit data written to the memory locations 282 of the NVM 282 to other devices, such as the second node 290, for the purpose of duplicating the data and thus, maintaining recoverability in the event of various types of failure. The NVM 280 and/or controller 250 may track the dirty flags to determine flush requirements and/or transfer requirements to other nodes, such as the second node 290.

The group table 210 is shown to include a group number column 211, a transfer attribute column 213, an initial address column 215, a range size column 217 and a ready flag column 219. Here, the group number column 211 indicates that the group table 210 has three groups 1-3. Each of the groups 211 is associated with a transfer attribute of the transfer attribute column 213 that determines whether the associated group is to be flushed and/or transferred in response to the synch command. The group table 210 may further determine an order the controller 250 flushes the data 266 and/or which of the data 266 the controller 250 flushes based on a type of the transfer attribute.

For example, the transfer attribute 213 may have a value of never, always or conditional. The never value may indicate that the corresponding group is not to be flushed and/or transferred in response to the synch command. The always value may indicate that the corresponding group is to always be flushed and/or transferred in response to the synch command. The conditional value may indicate that the corresponding group is only to be flushed and/or transferred if a type of the synch command is master. Thus, in FIG. 2, in response to the synch command, the first group 1 may never be flushed and/or transferred, the second group 2 may always be flushed and/or transferred and the third group 3 may be flushed and/or transferred only if the synch command is a master type (as opposed to a normal type). As explained below, when configured to operate in a COW mode, writes are redirected to a copy of a location at the NVM 280 and normal synchronization operations flush data to the copy but do not modify the original location at the NVM 280 nor designate the copy for transmission to the NVM 280 or second node 290. However, master type synchronization operations may cause all copied locations in the subgroup to be flushed to the NVM 280 itself. Thus, master type synchronization operations may enable integration with COW implementations through a compatible interface and enable further optimization of replica transmission.

The group address range 114 described in FIG. 1 may include an initial address from the initial address column 215 and a corresponding range size from the range size column 217 of the group table 210. The range size may indicate a number of consecutive addresses following the initial address that are included in the group address range. In one embodiment, these addresses may be physical addresses in that they do not change across access context or time. For example, these addresses may reference the same data storage locations in the NVM 280 regardless of which processor thread, process or node is doing the access. Furthermore, these physical addresses may reference the same data storage locations over time regardless of the virtual addresses to which they are currently mapped. These addresses in the groups may correspond to the physical addresses of the physical address column 274 of the VM table 270.

In some embodiments, these addresses 215 and 217 may undergo additional redirection before actual bit storage cells are accessed to accommodate various types of packaging, encoding, interleaving, striping and so forth at lower levels of NVM implementation. Other embodiments may at times use addresses 215 and 217 corresponding to the virtual addresses in the virtual address column 272 of the VM table 270. Still other embodiments may use a universal unique identifier as at least part of the addresses 215 and 217, such that the memory locations can be translated into multiple views as needed. Although the group address range consists of an initial address and a range size, embodiments of the group address range may be of any size and/or address resolution. For example, the address resolution may be bytes, cache lines, cache pages or other blocking factors.

The ready flag column 219 of the group table 210 may provide a ready flag for each of the group address ranges. The ready flag may relate to scheduling a transfer of the associated group address range to another node, such as the second node 290. For example, if the transfer ready flag is reset or 0, this may indicate that there is currently no need to transfer the associated group address range. On the other hand, if the transfer ready flag is set or 1, this may indicate that transfer of the associated group address range is being orchestrated (e.g., requested, queued or in progress).

Here, the three groups 1-3 of the group table 210 each have a different transfer attribute setting. The group address ranges contained in the various groups 1-3 are non-overlapping. Therefore, each memory location 282 of the NVM 280 is in at most one group. The group address ranges starting with the initial 1 and 2000 have the ready flag set. Thus, they are currently being transferred to another server for purposes of redundancy, replication and/or participation in other rich data services.

The subgroup table 220 is shown to include a subgroup number column 221, COW column 223, an initial address column 225, a range size column 227 and a ready flag column 229. The subgroup number column 221, initial address column 225, range size column 227 and ready flag column 229 of the subgroup 220 may respectively be similar in function to the group number column 211, initial address column 215, range size column 217 and ready flag column 219 of the group table 210. For example, the subgroup number column 221 may list one or more subgroups. Each of the subgroups may be associated with a subgroup address range 225 and 227 and a ready flag from the ready flag column 229.

The subgroup address range 225 and 227 may consist of an initial address from the initial address column 225 and a range size from the range size column 227. Each of subgroup address ranges 225 and 227 is included in one of the group address ranges 215 and 217 of the group table 210. Thus, every address in a sub-group is also in one of the groups. In this embodiment, any subgroup is also entirely contained within a single one of the groups. Each of the subgroups is also associated with a COW flag of the COW flag column 223. The COW flag ray indicate that the corresponding subgroup uses a COW operation.

The COW flag may be set if writes to the corresponding subgroup address range are to be carried out on a copy of the data corresponding to subgroup address range. For example, if the COW flag is set, the processor 260 may make a copy of data at a NVM 280 memory location 282 (such as an address or range or page of addresses) before the memory location 280 is marked as dirty in the VM table 270. Subsequent reads and writes may then be redirected to the copied data. The original data may be used to recover to a consistent state after a power loss. The controller 250 may wait to write the copied data back to the NVM 280 until the copied data is transferred to another device, such as the second node 290, in response to the synch command.

The COW 240 engine may be, for example, a hardware device including electronic circuitry for implementing the functionality described below, such as control logic and/or memory. In addition or as an alternative, the COW 240 engine may be implemented as a series of instructions encoded on a machine-readable storage medium and executable by a processor. The COW 240 engine may generate the copies of data 242 associated with the subgroup address range 225 and 227 in response to write operations by the processor 260 to the subgroup address range 225 and 227. The copies of the data may written to the NVM 280 if the COW flag is set and the type of the synch command is master.

The subgroup address ranges 225 and 227 included in a group are associated with the transfer attribute of that group. Here, the subgroups 1 and 2 are subsets of the third group 3, which has a conditional transfer attribute. Since the COW flag is set for the subgroup 2, if the master type synch command is received having a synch address range included in the subgroup 2, then the copied data of the subgroup 2 is to be written to the NVM 280 after the copied data is transferred to second node 290.

There is a precedence relationship between groups and subgroups such that synchronize operations that address locations in a subgroup do not apply to locations in other subgroups. The synchronize operations, however, do apply to locations in the same group, which are not in any other subgroup. This enables a useful capability to manage fine grained consistency for some data structures and coarse grained consistency for others. For example, bulk data may be in a group but not in a subgroup while related metadata may be in subgroup within that same group. In this example, if the synch range includes any location within the subgroup containing metadata, this may automatically causes synchronization of the entire subgroup as well as the bulk data at large in the associated group.

Non subgroup data may be synchronized first, followed by subgroup data, followed by the data specified by the synch address range. If the COW flag of the subgroup is set, the copied data may be written back to the NVM 280 as part of the synchronization of the subgroup. The ready flag of a group address range may not apply to any locations that are currently within subgroups, as it is overridden by the subgroup's ready flag. A value of the ready flag for the subgroup address range 225 and 227 may supersede a value of the ready flag for the group address range 215 and 217 including the subgroup address range 225 and 227.

The synchronization operation may include the flush and/or transfer operation. The transfer operation may follow the flush operation and follow the order described above with respect to synchronization. The transfer operation may be carried out by the controller 250, with the flushed data being transferred to another device, such as the second node 290, in response to the synch command. For example, the controller 250 may flush and transfer the group address range 215 and 217 including the subgroup address range 225 and 227 before the subgroup address range 225 and 227 and may transfer and flush the subgroup address range 225 and 227 before the synch address range, if the synch address range is included in the subgroup address range.

The group or subgroup address range to be transferred may be first recorded by setting the ready flag in either the subgroup or group depending on the precedence description above. Then, the data in the address range may be sent to the second node 290 participating in the group. The ready flags of the group and subgroup address ranges may be reset after the corresponding group and/or subgroup address range is transferred to the second node 290 during a given synchronization operation, unless the group and/or subgroup address range is the last range being transferred.

In this case, the controller 250 may wait to reset the ready flag of the last range, until after the entire transfer is complete. For example, as noted above, the controller 250 may generally transfer the synch address range last to the second node 290. Then, the controller 250 may transmit a marker or packet to the second node 290 to indicate that a consistency point has been reached. Recoverable consistency points may span multiple memory ranges (such as pages or cache lines, multiple synch ops and multiple servers).

The resetting of the last transfer ready flag is thus delayed until the transfer of the marker is complete and all COW data have been committed to the NVM 280. When the transfer is complete, the associated dirty flag in the VM table 270 is reset by the controller 250. When there are no more address ranges associated with set ready flags, in the subgroup or group, the transfer is complete.

The log unit 230 may store a list of the data that is successfully transferred to the second node 290 and may also store the data that is to be transferred to the second node 290. Here, the log unit 230 is shown to include an initial address column 232, a range size column 234, a data column 235 and a marker column 238. The initial address and range size columns 232 and 234 of the log unit 230 may be similar in function to the initial address and range size columns 215 and 217 of the group table 210. For example, the initial address and range size columns 232 and 234 of the log unit 230 may list the group or subgroup address ranges for the which the transfer to the second node 290 is being orchestrated. The data column 236 may serve as a queue or buffer for the data to be transferred to the second node 290.

A marker of the marker column 238 may be set by the controller 250 after the corresponding group and/or subgroup address ranges have been successfully transferred to the second node. Thus, in the event that the transfer is interrupted, such as during a power failure, the controller 250 may check the log unit 230 afterward to determine which of the address ranges were transferred successfully. Thus, the controller 250 may not resend the data for which the marker is set, Conversely, the controller 250 may discard any data that was to be sent after the marker was set, in order to revert to a prior consistency point. Further, due to the log unit 230 acting as a buffer for the data, the log unit 230 may transfer the data independently of the controller 250, thus freeing the controller 250 to carry out other operations. Hence, the log unit 230 may improve the efficiency of data transfer to the second node 290.

The groups and subgroups may be created, modified and/or discarded by an application (not shown). For example, an application may map NVM space for its use into the processor's VM space. Then, the application may access data using processor instructions with operands that reference memory, such as the NVM 280. When memory locations are written to, the processor 260 may mark these location as dirty within the VM table 270. During this stage of memory mapped storage use, the application may create groups and/or subgroups and populate them with memory location range information. The subgroups may be transient or long lived depending on the requirements of the application.

Embodiments may reduce an amount of data to be flushed and/or transferred by allowing applications to explicitly express which memory locations are be synchronized together as part of the same group. The existence of groups having group address ranges may enable application consistency requirements to be implemented by synchronization operations while maintaining backward compatibility of synchronization operation syntax. Having subgroups within groups may enable finer grained cache flushing which reduces performance disruption. In addition, address ranges within subgroups and outside of sub-groups may be correctly managed within a single group. Groups and subgroups may enable more efficient transmission of recent writes for redundancy, remote replication or point in time copy in that fine grained updates can be grouped into less frequent transmissions based on explicitly specified application requirements and behavior.

Figure 3:
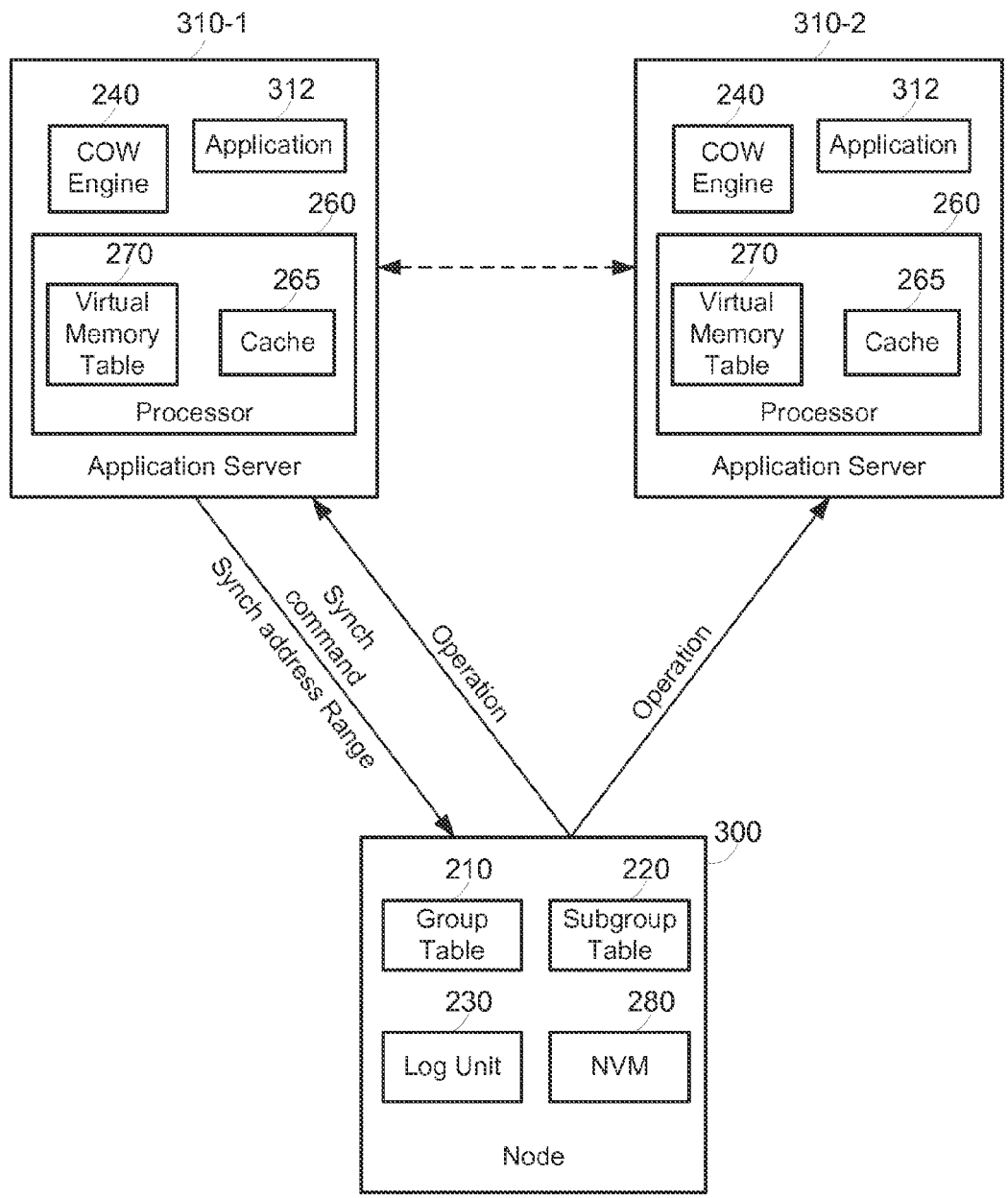
FIG. 3 is an example block diagram of a node being shared by application servers.

FIG. 3 is an example block diagram of a node 300 being shared by application servers 310. In this embodiment, two application servers 310-1 and 310-2 are shown to be sharing the node 300. However, embodiments may allow for more or less than two applications servers 310 to share a single node 300. Here, the node 300 is shown to include the group table 210, the subgroup table 220, the log unit 230 and the NVM 280. The application servers 310 are each shown to include the COW engine 240 and the processor 260, where the processor 260 includes the cache 265 and the VM table 270. In addition, the application servers 310 are shown to include an application 312 that is responsible for invoking the synch command as well as issuing writes to the NVM 280.

The application server 310 may be any type of device that seeks to access the NVM 280 of the node 300, such as a main processor of a computer or a computer connected to a computer network. For example, the application server 310 may present the VM table 270 that is mapped to an address space of the NVM for use by the application 312. In turn, the application 312 may seek read and/or write accesses to the NVM 280.

Because the processors 260 pipeline data and instructions, a failure or abrupt power loss may result in the loss of data that has been manipulated by the applications 312 but not yet stored, or committed, to the NVM 280. Therefore, during its course of operation, the applications 312 may generate synchronization commands for purposes of assuring sufficient data consistency to guarantee recoverability in the event of failure or abrupt power loss. The synchronization points created by the synchronization commands are used, in accordance with example implementations disclosed herein, for purposes of assuring that redundant copies of the data are stored. The application servers 310-1 and 310-2 may also communicate with each other directly, as shown in FIG. 3, such as for synchronization purposes. Further, the node 300 may also communicate directly with another node (not shown), for similar reasons.

While each of the application servers 310 are shown to include a single application 312, embodiments of the application server 310 may include a plurality of applications 312. Thus, the node 300 may receive the synch command from a plurality of applications 312 and/or plurality of application servers 310 that are external to the node 300.

For example, the node 300 may perform an operation on a first application server 310-1 of the plurality of application servers 310 if the node 300 receives the synch command from the first application server 310. Example operations may include reading and/or writing dirty bits of the VM table 270 of the associated application server 310, flushing a cache 265 of the associated application server 310 and/or writing COW data of the associated application server 310 to the NVM 280.

Further, the node 300 may perform at least part of the same operation on a second application server 310-2 of the plurality of application servers 310 in response to the synch command of the first application server 310-1, if the second application server 310-2 shares the group table 210 with the first application server 310-1. Thus, a synchronization operation by one of the applications servers 310-1 in order to ensure consistency may cause at least part of a synchronization operation to occur in another of the application servers 310-2, due to the application servers 310-1 and 310-2 sharing the group table 210 while maintaining individual VM tables 270. Shared groups via the shared group table 210 may enable consistency across clustered applications that are not in the same memory domain. Thus, embodiments may apply to a single node 300 that replicates to its fellow nodes, or in a shared memory environment.

Figure 4:
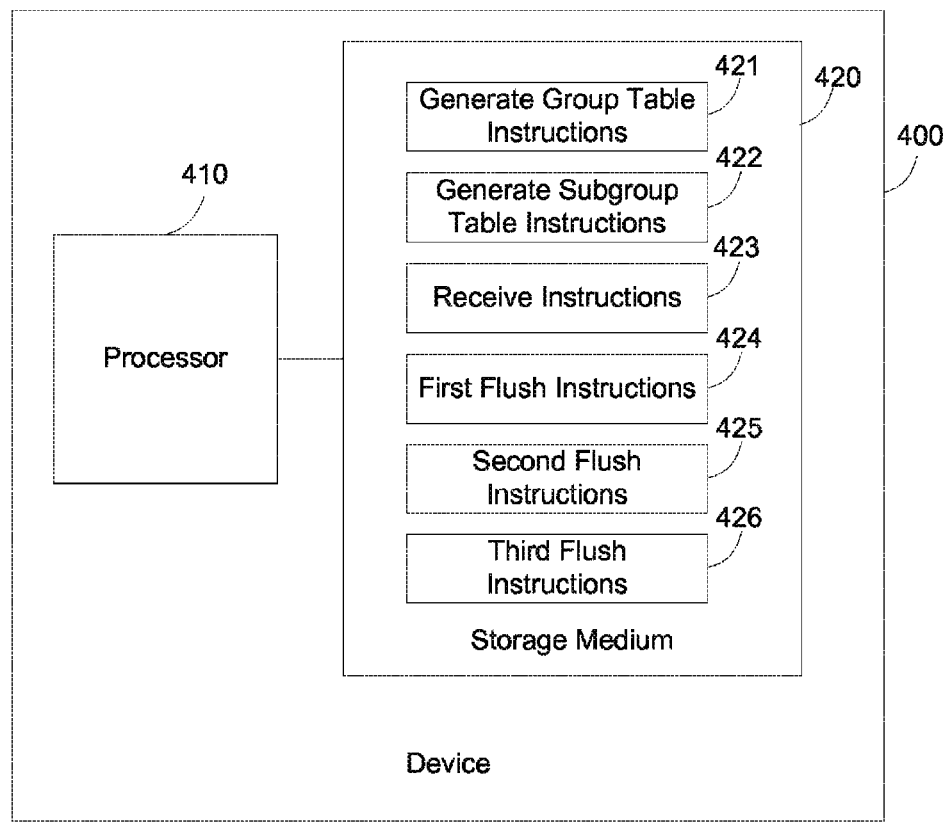
FIG. 4 is an example block diagram of a computing device including instructions for flushing data to a non-volatile memory.

FIG. 4 is an example block diagram of a computing device 400 including instructions for flushing data to a NVM. In the embodiment of FIG. 4, the computing device 400 includes a processor 410 and a machine-readable storage medium 420. The machine-readable storage medium 420 further includes instructions 421 to 426 for flushing data to a NVM (not shown).

The computing device 400 may be, for example, a secure microprocessor, a notebook computer, a desktop computer, an all-in-one system, a server, a network device, a controller, a wireless device, or any other type of device capable of executing the instructions 421 to 426. In certain examples, the computing device 400 may include or be connected to additional components such as memories, controllers, etc.

The processor 410 may be, at least one central processing unit (CPU), at least one semiconductor-based microprocessor, at least one graphics processing unit (GPU), other hardware devices suitable for retrieval and execution of instructions stored in the machine-readable storage medium 420, or combinations thereof. The processor 410 may fetch, decode, and execute instructions 421 to 426 to implement flushing data to the NVM. As an alternative or in addition to retrieving and executing instructions, the processor 410 may include at least one integrated circuit (IC), other control logic, other electronic circuits, or combinations thereof that include a number of electronic components for performing the functionality of instructions 421 to 426.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 420 can be non-transitory. As described in detail below, machine-readable storage medium 420 may be encoded with a series of executable instructions for flushing data to the NVM.

Moreover, the instructions 421 to 426 when executed by a processor (e.g., via one processing element or multiple processing elements of the processor) can cause the processor to perform processes, such as, the process of FIG. 4. For example, the generate group table instructions 421 may be executed by the processor 410 to generate a group table (not shown) including one or more groups. Each of the groups may be associated with a group address range and a transfer attribute. The generate subgroup table instructions 422 may be executed by the processor 410 to generate a subgroup table (not shown) including a one or more subgroups. Each of the subgroups may be associated with a subgroup address range and a transfer attribute (though the group) and each of the subgroup address ranges may be included in one of the group address ranges.

The receive instructions 423 may be executed by the processor 410 to receive a synch command including a synch address range. The first flush instructions 424 may be executed by the processor 410 to first flush data to a NVM (not shown) of any group range address range including the synch address range, excluding the synch address range and any subgroups including the synch address range, based on the transfer attribute of the associated group.

The second flush instructions 425 may be executed by the processor 410 to second flush data to the NVM of any subgroup including the synch address range, excluding the synch address range, after the first flush, based on the transfer attribute of the group including the associated subgroup. The third flush instructions 426 may be executed by the processor 410 to third flush data to the NVIVI of the synch address range, after the second flush.

FIG. 5 is an example flowchart of a method 500 for flushing and transferring data. Although execution of the method 500 is described below with reference to the first node 200, other suitable components for execution of the method 400 can be utilized, such as the node 100 or 300. Additionally, the components for executing the method 500 may be spread among multiple devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 420, and/or in the form of electronic circuitry.

At block 505, the first node 200 receives a synch command including a synch address range. Then, at block 510, the first node 200 determines if the synch address range is included in any groups of the group table 210. If the synch address range is not included in any of the groups 211, the method 500 flows to block 515, where the first node 200 flushes data of the synch address range, such as to the NVM 280. Next, at block 520, the first node 200 transfers the data of the flushed synch address range from the first node 200 to the second node 290.

However, if the synch address range is included in one of the groups 211, the method 500 flows from block 510 to block 525, where the first node 200 determines if the synch address range is included in any subgroups of the subgroup table 220. Each of the subgroups is included in one of the groups 211. If the synch address range is not included in any of the subgroups 221, the method 500 flows to block 550, where the first node 200 flushes data of the group 211 that includes the synch address range but excludes the synch address range from being flushed. Next, at block 555, the first node 200 flushes the data of the synch address range. Lastly, at block 560, the first node 200 transfers the data of the flushed group and the flushed synch address range from the first node 200 to the second node 290.

However, if the synch address range is included in one of the subgroups, the method 500 flows from block 225 to block 530, where the first node 200 flushes data of the group that includes the synch address range but excludes both the subgroup including the sync address range and the synch address range itself. Then, at block 535, the first node 200 flushes the data of the subgroup that includes the synch address range but excludes the sync address range from being flushed. Next, at block 540, the first node 200 flushes the data of the synch address range. Lastly, at block 560, the first node 200 transfers the flushed data of the group 211, subgroup 221 and the synch address range from the first node 200 to the second node 290. While FIG. 5 shows the transfers to occur after the flushes, any of the address ranges maybe transferred immediately after being flushed.

According to the foregoing, embodiments provide a mechanism to assure that application consistency constraints represented by groups and subgroups therein are enforced across an entire scope of components involved in that application's operation including multiple NVM systems and associated storage functions. Data consistency guarantees are incorporated into synchronization operations that build on existing features of processors and memory controllers. Thus, the scope of durable data consistency is physically expanded while remaining aligned with application boundaries.

By using a group to maintain a record of address ranges that are to be managed together for application level consistency, embodiments enable a construction of a stream of recoverable consistency points that span multiple memory ranges such as pages or cache lines, multiple synchronization operations and multiple servers.

I claim:

1. A node, comprising:
a group table including one or more groups, each of the groups associated with a group address range, the group address ranges to be mapped to a memory location of a nonvolatile memory (NVM); and
a controller to receive a synch command with an associated synch address range and to flush data from a cache to the NVM according to an order determined by the controller based on the group table, wherein
the controller is to determine at least one of the order the controller flushes the data and which of the data the controller flushes based on whether the synch address range is included in one of the group address ranges.

2. The node of claim 1, wherein,
each of the groups of the group table is associated with a transfer attribute, and
the controller is to further determine at least one of the order the controller flushes the data and which of the data the controller flushes based on a type of the transfer attribute.

3. The node of claim 1, wherein,
the controller is to transfer the flushed data to another node in response to the synch command,
each of the group address ranges is associated with a ready flag, and
the controller is to set the ready flag of the associated group address range before the associated group range is transferred.

4. The node of claim 3, wherein,
the node includes a virtual memory (VM) table that includes addresses associated with dirty flags that are set if a write operation is carried out on the associated address, and
the controller is to determine the synch address range based on one of the addresses in the VM table whose dirty flag is set.

5. The node of claim 4, wherein,
the controller is to reset the ready flag after the transfer of the associated group address range to the other node is complete, and
the controller is to reset the dirty flag after the all ready flags are reset to indicate that transfer to the other node is complete.

6. The node of claim 5, wherein, the controller is to transfer the synch address range last, and the controller is to transmit a marker to the other node after the synch address range is transferred to the other node to indicate that a consistency point has been reached.

7. The node of claims 3, wherein, each of the groups of the group table is associated with a transfer attribute that includes a never value, an always value, and a conditional value, the never value indicates that the corresponding group is not to be transferred in response to the synch command, the always value indicates that the corresponding group is to be transferred in response to the synch command, and the conditional value indicates that the corresponding group is only to be transferred if a type of the synch command is master.

8. The node of claim 7, further comprising:

a subgroup table including one or more subgroups, each of the subgroups to be associated with a subgroup address range and the ready flag, wherein each of subgroup address ranges is included in one of the group address ranges of the group table, and each of the subgroups to be associated with a copy-on-write (COW) flag, the COW flag to be set if writes to the corresponding subgroup address range are to be carried out on a copy of data of the corresponding subgroup address range.

9. The node of claim 8, wherein, the subgroup address ranges are included in a group of the group table that is associated with the conditional value of the transfer attribute, a value of the ready flag for the subgroup address range supersedes a value of the ready flag for the group address range including the subgroup address range, the controller is to, if the synch address range is included in the subgroup address range, transfer the group address range that includes the subgroup address range before the subgroup address range and to transfer the subgroup address range before the synch address range.

10. The node of claim 8, further comprising:

a COW engine to generate copies of data associated with the subgroup address range in response to write operations by a CPU to the subgroup address range, wherein the copies of the data are written to the NVM if the COW flag is set and the type of the synch command is master.

11. The node of claim 1, further comprising:

a log unit, wherein the controller is to place the flushed data in the log unit in response to the synch command, and the log unit is to:

transfer the data placed therein to another node, store a list of data that is successfully transferred to the other node, and not resend the data stored in the list, if the transfer is interrupted and then resumed.

12. The node of claim 1, wherein, the node includes the NVM and is to receive the synch command from a plurality of applications at a plurality of application servers external to the node, the node is to perform an operation on a first application server of the plurality of application servers if the nodes receives the synch command from the first application server, the operation is to include at least one of read and write dirty flags of a virtual memory table of the associated application server, flush a cache of the associated application server, and write copy-on-write (COW) data of the associated application server to the NVM, and the node is to perform the operation on a second application server of the plurality of application servers in response to the synch command of the first application server, if the second application server shares the group table with the first application server.

13. A method, comprising:

receiving a synch command with an associated synch address range;

identifying a group and a subgroup that includes the synch address range from among groups of a group table and subgroups of a subgroup table, each of the subgroups being included in one of the groups;

flushing data in the following order:

first flushing data of the group that includes the synch address range, excluding data of the synch address range and data of any of the subgroups included in the group that includes the synch address range;

next, flushing data of the subgroup that includes the synch address range excluding the data of the synch address range; and next, flushing the data of the synch address range; and transferring the flushed data from a first node to a second node.

14. The method of claim 13, wherein, each of the groups and subgroups include an address range having an initial address and a range size, the range size to indicate a number of consecutive addresses following the initial address that are included in the address range, the groups and subgroups are defined by an application of the first node, and each of the groups is associated with a transfer attribute that controls whether the associated group is to be flushed in response to the synch command.

15. A non-transitory computer-readable storage medium storing instructions that, if executed by a processor of a device, cause the processor to:

generate a group table including one or more groups, each of the groups associated with a group address range and a transfer attribute;

generate a subgroup table including one or more subgroups, each of the subgroups corresponding to one of the groups and being associated with a subgroup address range that is included in one of the group address ranges of the corresponding group;

receive a synch command including a synch address range, and in response thereto:

first flush to a non-volatile memory (NVM) data of any group that includes the synch address range and whose transfer attribute permits flushing, excluding the synch address range and any subgroups included in the group that includes the synch address range;

second flush to the NVM data of any subgroup that includes the synch address range and whose group's transfer attribute permits flushing, excluding the synch address range, after the first flush; and third flush to the NVM data of the synch address range, after the second flush.

16. The non-transitory computer-readable storage medium 15,
wherein the transfer attribute includes an always value, a never value, and a conditional value;
the never value does not permit flushing,
the always value permits flushing, and
the conditional value permits flushing if a type of the synch command is master.

17. The non-transitory computer-readable storage medium 15, wherein the instructions further cause the processor to:
in response to the synch command, transferring the flushed data, in the same order that is was flushed, to a second node that is separate from a first node that includes the processor.

18. The non-transitory computer-readable storage medium 17,
wherein each of the group address ranges is associated with a ready flag, and
the instructions further cause the processor to set the ready flag of each group address range that is to be transferred before the associated group range is transferred.

19. The non-transitory computer-readable storage medium 18, wherein the instructions further cause the processor to:
for each of the group address ranges that are transferred to the second node, reset the ready flag after the transfer of the group address range to the second node is complete;
transmit a marker to the second node after the synch address range is transferred to the second node to indicate that a consistency point has been reached; and
for a last one of the group address ranges that is to be transferred to the second node in response to the synch command, wait to reset the associated ready flag until after the transmit marker has been sent and all of the flushed data has been successfully committed to the NVM.

20. The non-transitory computer-readable storage medium 15,
wherein each of the subgroups is associated with a copy-on-write (COW) flag; and
the instructions further cause the processor to:
redirect flushed data that is from a subgroup whose COW flag is set to a copied address rather than to the NVM if the synch command is not a master type; and
write flushed data that is from a subgroup whose COW flag is set to the NVM if the synch command is a master type.

* * * * *